(12) United States Patent
Giroudiere et al.

(10) Patent No.: US 8,728,417 B2
(45) Date of Patent: May 20, 2014

(54) STEAM REFORMING FURNACE USING POROUS BURNERS (75) Inventors: Fabrice Giroudiere, Orlienas (FR); Beatrice Fischer, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1236 days.

(21) Appl. No.: 12/593,646

(22) PCT Filed: Mar. 5, 2008

(86) PCT No.: PCT/FR2008/000292
§ 371 (c)(1),
(2), (4) Date: Jan. 28, 2010

(87) PCT Pub. No.: WO2008/132312
PCT Pub. Date: Nov. 6, 2008

(65) Prior Publication Data
US 2010/0126908 A1    May 27, 2010

(30) Foreign Application Priority Data

Mar. 30, 2007   (FR) ...................................... 07 02412

(51) Int. Cl.
*B01J 8/06*        (2006.01)
*C01B 3/38*        (2006.01)
*C01B 3/40*        (2006.01)

(52) U.S. Cl.
USPC ........... 422/659; 422/651; 422/652; 422/653; 422/654; 208/133; 208/134; 48/214 A (58) Field of Classification Search
USPC .......... 422/197, 650–654, 659; 208/133, 134; 48/214 A
See application file for complete search history.

(56) References Cited

U.S. PATENT DOCUMENTS

| | | | | |
|---|---|---|---|---|
| 3,119,671 A | * | 1/1964 | James et al. | 422/621 |
| 4,810,472 A | * | 3/1989 | Andrew et al. | 422/629 |
| 4,900,245 A | * | 2/1990 | Ahmady | 431/328 |
| 2002/0043022 A1 | * | 4/2002 | Warren | 48/94 |

FOREIGN PATENT DOCUMENTS

| | | | |
|---|---|---|---|
| DE | 199 21 420 A1 | 11/2000 | |
| WO | WO 2006/119812 A1 | 11/2006 | |

OTHER PUBLICATIONS

International Search Report of PCT/FR2008/000292 (Oct. 8, 2008).

* cited by examiner

*Primary Examiner* — Renee E Robinson
(74) *Attorney, Agent, or Firm* — Millen, White, Zelano & Branigan, P.C.

(57) ABSTRACT

The present invention describes a steam reforming furnace for the production of hydrogen, which employs a set of porous burners interposed between the tubes to be heated, improving compactness of the furnace.

8 Claims, 5 Drawing Sheets

STEAM REFORMING FURNACE USING POROUS BURNERS

FIELD OF THE INVENTION

The invention relates to the field of furnaces for steam reforming a hydrocarbon feed to produce a synthesis gas. The feed used may be any hydrocarbon containing 1 to 30 carbon atoms, but it is usually constituted by natural gas or a cut which is analogous to a light gasoline, termed "naphtha".

Steam reforming furnaces are typically constituted by a set of vertical tubes 10 to 15 meters in length, inside which the process fluid circulates, that set of tubes being organized into a plurality of parallel rows.

The tubes are heated by a set of burners disposed in a variety of manners.

In "top fired" furnaces, the burners are placed in the upper portion of the furnace, the flame resulting from the burners being directed from top to bottom.

In terrace-wall fired furnaces, the burners are disposed in several horizontal rows substantially perpendicular to the plane of the tubes, those rows, known as terraces, being staged along said tubes.

Finally, furnaces also exist in which the burners are installed in the lower portion termed the hearth, the flame resulting from the burners being orientated from bottom to top.

Those various configurations all supply the energy necessary for the steam reforming reactions in the form of a discrete set of heated points surrounding the tubes to be heated in a substantially uniform manner.

In the present invention, because of the type of burner used, this set of heated points is replaced by a continuous heating zone, which is substantially parallel to the tubes to be heated, and because the flame is confined, which allows the tubes to be heated to be close to the burners.

This results in both greater precision in the thermal flux along the tubes to be heated and improved compactness compared with prior art furnaces.

DESCRIPTION OF THE FIGURES

A flame is diagrammatically shown placed in the upper portion of the furnace and developing vertically downwards.

EXAMINATION OF THE PRIOR ART

Steam reforming furnaces are principally used for the production of hydrogen. They can convert a mixture of hydrocarbons and steam into a mixture of hydrogen, carbon monoxide and carbon monoxide.

A description of such furnaces can be found in many documents, for example in the work entitled "Catalyst Handbook" by Martyn V Twigg, $2^{nd}$ edition (1989).

Steam reforming furnaces include tubes filled with a nickel-based (Ni) catalyst which must be heated sufficiently to obtain a reactant outlet temperature of close to 900° C.

The pressure inside the steam reforming tubes is generally in the range 10 bars to 30 bars (1 bar=$10^5$ pascals).

These tubes are heated using burners, usually disposed in the arch of the furnace, in the hearth, or as a terrace, giving rise to the different types of furnaces mentioned above.

Figure 1:
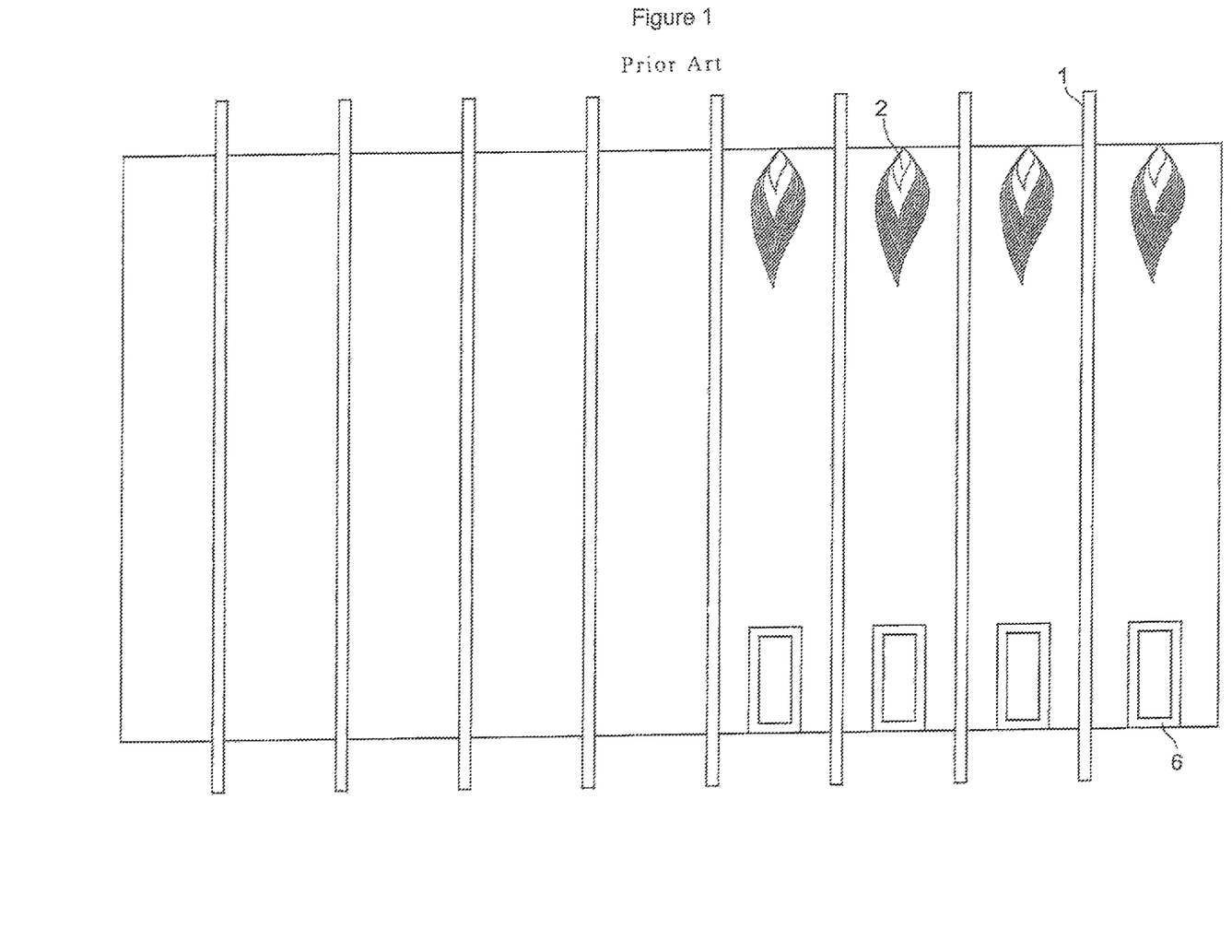
FIG. 1 shows a side view of a typical arrangement of burners and tubes to be heated in a prior art steam reforming furnace.

FIG. 1 diagrammatically shows a typical view of a prior art furnace with burners in the arch. The arrangement of the burners, denoted (2), with respect to the tubes to be heated, denoted (1), is shown. The spacing between two rows of tubes is close to 2 m, and the spacing between two tubes of a single row is normally 200 mm to 400 mm, depending on the diameter of the tubes.

The tube diameter is generally in the range 70 mm to 150 mm; they are generally in the range 7 meters to 15 meters long; the fraction of the tube which is filled with catalyst is usually about 10 m in length.

FIG. 1 also shows the flame leaving the burners (2) placed in the arch. Said flame must not touch the adjacent tubes (1) to prevent the tubes from flowing; this explains the large spacing between the rows of tubes.

Currently, because of this spacing constraint, the number of tubes per steam reforming furnace is limited to about 1000, which limits the capacity for a hydrogen production unit to a maximum value of about 100000 $m^3$/hour of $H_2$ produced.

Hydrogen ($H_2$) is not directly produced at the outlet from the steam reforming furnace.

The effluent from the furnace is a mixture of CO, $CO_2$, $H_2$ and $H_2O$ which is transformed in a first unit termed the CO conversion unit at low temperature to maximize the proportion of $H_2$ in the mixture.

Next, in a second unit, the $CO_2$ and $H_2O$ are eliminated to leave hydrogen with a purity which is generally close to 95%, which can be improved if necessary using a unit for membrane separation of the remaining $CO_2$, which can recover hydrogen in a purity of more than 98%.

The whole hydrogen production chain downstream of the steam reforming furnace does not form part of the present invention which is solely concerned with the furnace. However, the power of a furnace is often characterized by its hydrogen production capacity.

Finally, it will be noted that the structure of a prior art steam reforming furnace includes the presence of flues (6) allowing combustion fumes to be evacuated via the lower part of the furnace, air generally being introduced as a mixture with the fuel directly to the burners.

BRIEF DESCRIPTION OF THE INVENTION

The present invention concerns a furnace for steam reforming a hydrocarbon cut generally containing 1 to 30 carbon atoms for the production of hydrogen, said furnace comprising a set of vertical tubes partially filled with nickel-based catalyst.

The tubes of the steam reforming furnace of the invention are distributed in the form of parallel rows, the heat necessary for the steam reforming reaction being supplied to the catalyst tubes by combustion using porous longilinear burners disposed in the form of rows which are interposed between the rows of tubes to be heated.

The distance between two rows of tubes between which a row of burners is interposed is generally in the range 600 mm to 1200 mm, preferably in the range 650 mm to 1000 mm.

The distance between a row of burners and the closest row of tubes is thus in the range 300 mm to 600 mm, preferably in the range 300 mm to 500 mm.

The centre-to-centre distance between two consecutive tubes belonging to the same row is generally in the range 250 mm to 400 mm, preferably in the range 300 mm to 400 mm.

The combustion air is usually supplied via flues located at the top of the furnace, and the combustion fumes are collected via flues located at the bottom of the furnace.

In another variation, the combustion air is supplied by flues located at the bottom of the furnace and the combustion fumes are collected by flues located in the top of the furnace.

The fuel used in the furnace of the invention may be of any nature. Usually, it is a fuel derived from a purge of refinery units, or from natural gas, or from any mixture of various fuels available at the site where the steam reforming furnace is installed.

The burners used in the steam reforming furnace of the invention are porous longilinear burners constituted by a central longilinear distributor which is generally cylindrical in shape, surrounded by a porous annular element. The distance between the outer wall of the distributor and the porous annular element is generally in the range 0.5 cm to 10 cm.

The porosity of the porous element is generally below 50%, preferably below 20%.

The tubes to be heated may be simple vertical tubes extending over the entire height of the furnace or, in a preferred variation, they may be bayonet type tubes, suspended from the upper wall of the furnace.

The tube suspension system may be of any type which is known to the skilled person; the invention is not concerned with the particular suspension system.

For a furnace with a hydrogen production capacity in the range 50000 $Nm^3$/hour to 150000 $Nm^3$/hour, the tubes to be heated are generally in the range 7 meters to 15 meters long, preferably in the range 10 meters to 14 meters long.

The invention may also be defined as a process for steam reforming natural gas or naphtha employing a furnace in accordance with the invention.

In some cases the fuel used may contain hydrogen in a proportion of 5% to 100% molar. In a particular case, the fuel used may be constituted by hydrogen alone, this hydrogen being partially derived from steam reforming furnace effluents.

The combustion air is generally supplied to the furnace having been preheated to a temperature of the order of 600° C., preferably to more than 700° C.

DETAILED DESCRIPTION OF THE INVENTION

The present invention concerns a development in steam reforming furnaces consecutive to the use of a type of burner, termed a porous burner, which can generate a flame confined to the immediate vicinity of a porous element forming an integral part of the burner. This flame, also known as a flat flame, can both better control the temperature profile along the tubes to be heated and substantially improve the compactness of the furnace set. The tubes to be heated are at least partially filled with a nickel-based catalyst in the form of cylinders about 16 mm in diameter and 10 mm in height. The reaction fluids circulate inside the tubes. Since the steam reforming reaction of an oil cut is highly endothermic, these tubes have to be heated to receive the heat necessary for the reaction.

More precisely, the present invention concerns the use of a porous longilinear burner which can heat a set of tubes and an arrangement between the tubes and burners which can produce a catalytic steam reforming furnace which is much more compact than those of the prior art.

Figure 2:
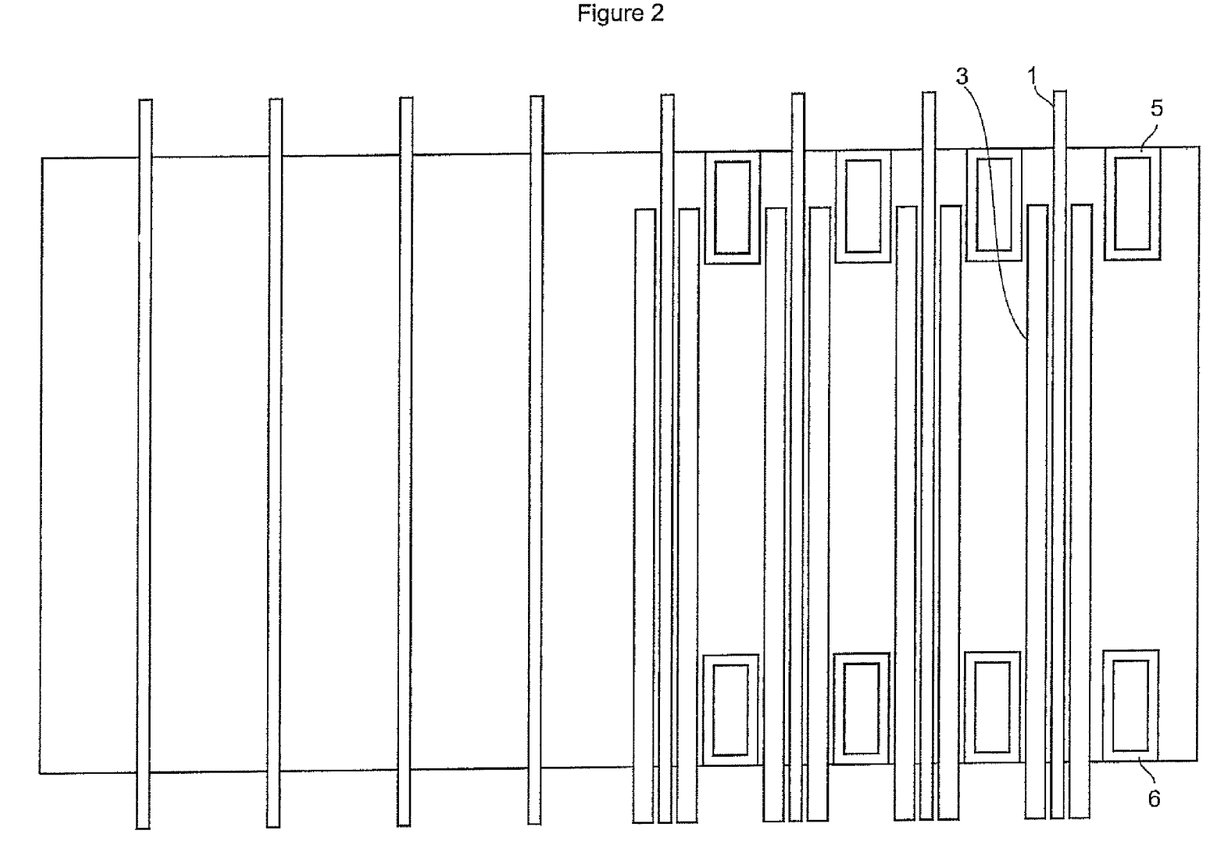
FIG. 2 shows a side view of a typical arrangement of burners and tubes to be heated in a steam reforming furnace in accordance with the invention.

FIG. 2, in accordance with the invention, shows the arrangement of porous burners (3) with respect to the tubes to be heated (1) which, in the case of FIG. 2, are simple tubes extending vertically from top to bottom of the furnace.

Figure 3:
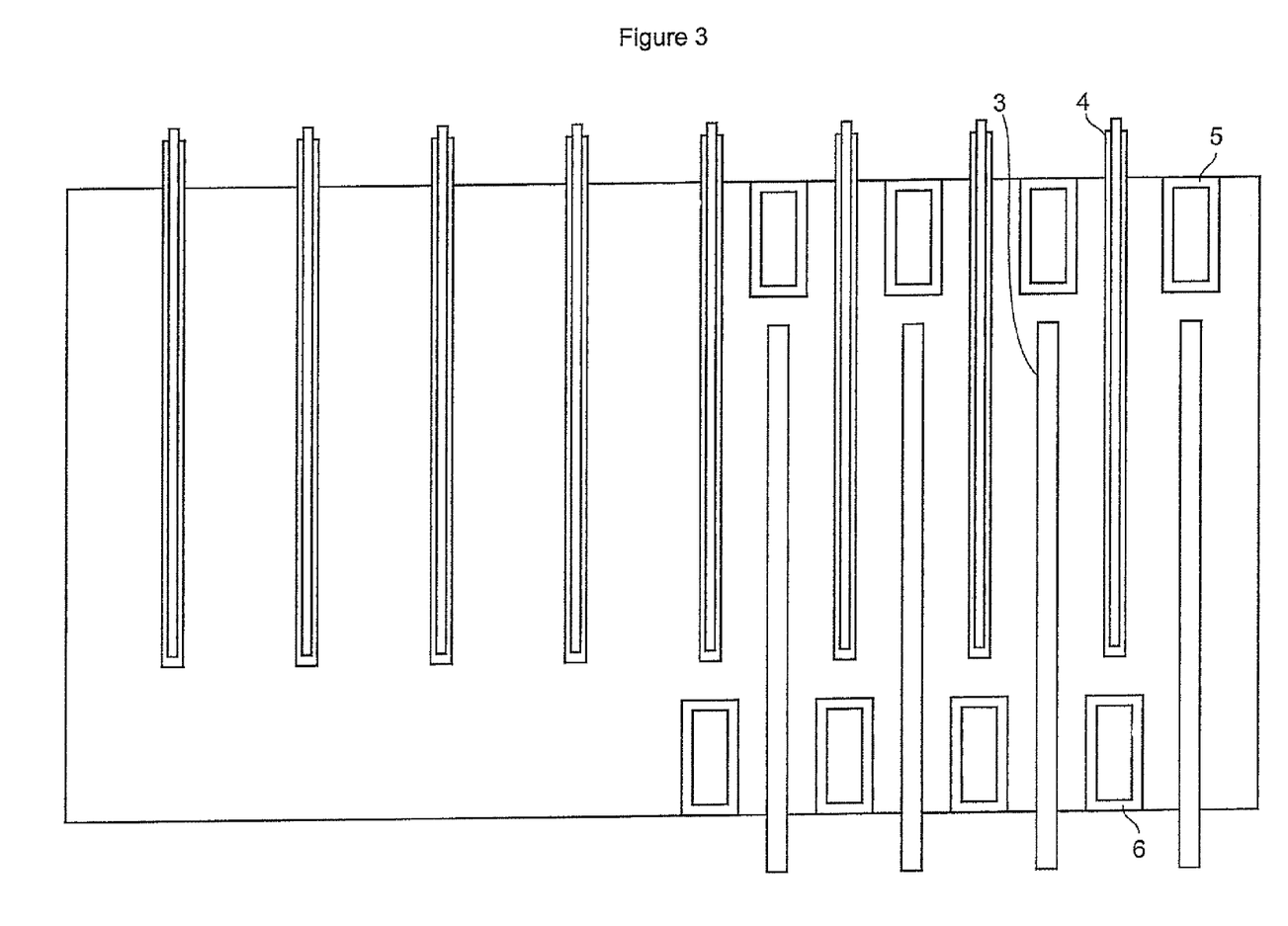
FIG. 3 shows a side view of a typical arrangement of burners and tubes to be heated in a steam reforming furnace in accordance with the invention, the tubes being of the bayonet type.

FIG. 3 shows the arrangement of a furnace of the invention using bayonet tubes (4) and porous burners (3). In the configuration shown in FIG. 3, the tubes do not reach to the bottom of the furnace hearth but stop above the fume evacuation flues (6) while the burners (3) stop below the air inlet flues (5).

This arrangement is much more compact than the arrangement with simple tubes, the rows of tubes being able to be spaced by a meter or less (as opposed to 2 meters or more in the prior art), which approximately doubles the capacity of a steam reforming hydrogen production unit compared with the prior art.

Figure 4:
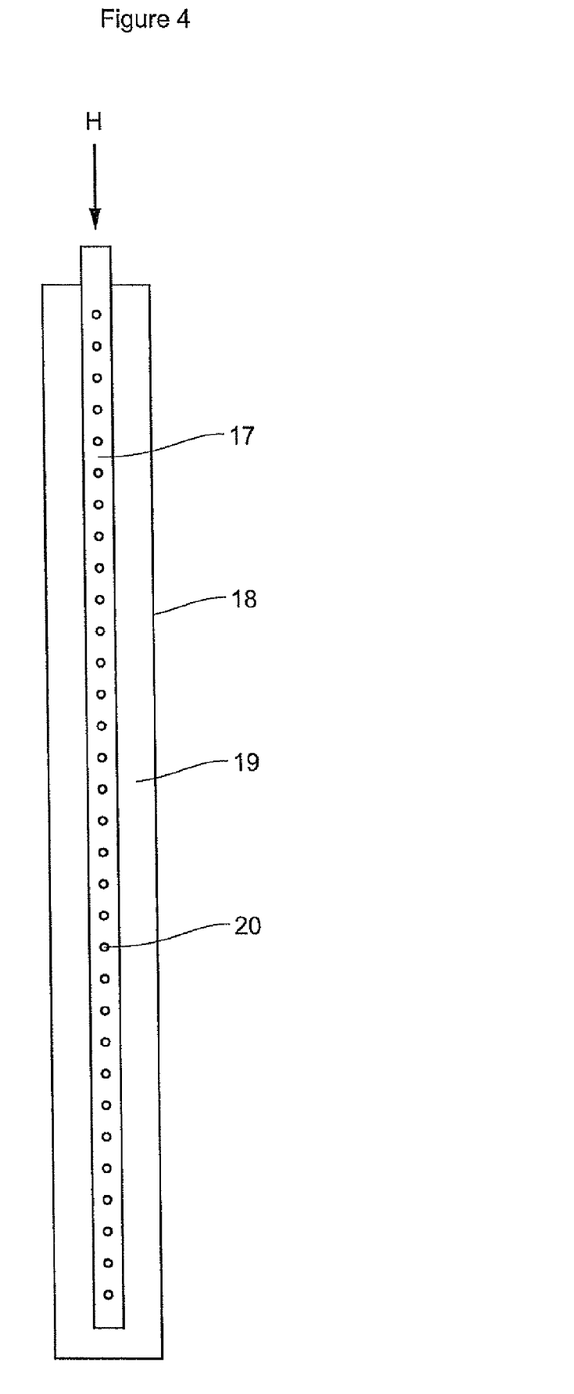
FIG. 4 shows a longilinear porous burner used in the present invention.

FIG. 4 shows the principal elements of a longilinear porous burner (3).

A complete description of this type of longilinear porous burner can be found in the patent application filed with number 06/10999.

The porous longilinear burners (3) are supplied with fuel (denoted (H) in FIG. 4) using a central distributor (17), which is itself substantially vertical, and which is surrounded by a porous element (18) which is annular in shape, with a thickness in the range 0.5 cm to 5 cm.

In this porous burner, the distance between the distributor and the porous element (zone (19) in FIG. 4)) has a value in the range 0.5 cm to 10 cm.

The porous element (18) has a porosity of less than 50% and preferably less than 30%, the porosity being defined as the void volume with respect to the bulk volume of said porous element.

The fuel (H) is distributed along the entire length of the central distributor (17), optionally by means of a set of orifices (20) with a diameter which varies with their position along the distributor, and burns in contact with combustion air at the surface or actually within the porous element (18).

The porous burners (3) used in the present invention have a central distributor (17) which may have a single sector with a single orifice diameter, or be divided into at least two sectors, each sector having orifices (20) of the same diameter, and the various sectors having orifices of a different diameter.

As an example, the central distributor (17) may be divided into at least two sectors, each sector having orifices (20) with a diameter which increases with axial distance along the distributor in the direction of flow of fuel.

By way of non-limiting example of the various embodiments of the distributor for the porous burners (3), the central distributor (17) may be divided into at least two sectors, each sector having orifices (20) with a diameter which increases in accordance with an exponential function in the direction of flow of fuel. This disposition can produce an approximately constant thermal flux through the length of the porous burner (3), which would not be the case with a single orifice diameter because of the pressure drop along the distributor which would necessarily result in a lower fuel flow rate for the orifices furthest from the end at which fuel is introduced into said distributor. This aspect is all the more important in the context of the present invention when the porous burners (3) can have lengths of 10 m or more; they may be up to 15 meters long.

The flame resulting from combustion remains confined to the immediate vicinity of the porous cylindrical element (18) such that a small distance of the order of 500 mm and preferably of the order of 400 mm, is sufficient between the burner (3) and the catalyst tubes (4) to avoid any risk of hot spots.

The oxidizer, generally combustion air, is supplied separately via flues (5) with no pre-mixing with the fuel, and the fumes are recovered by the flues (6).

Figure 5:
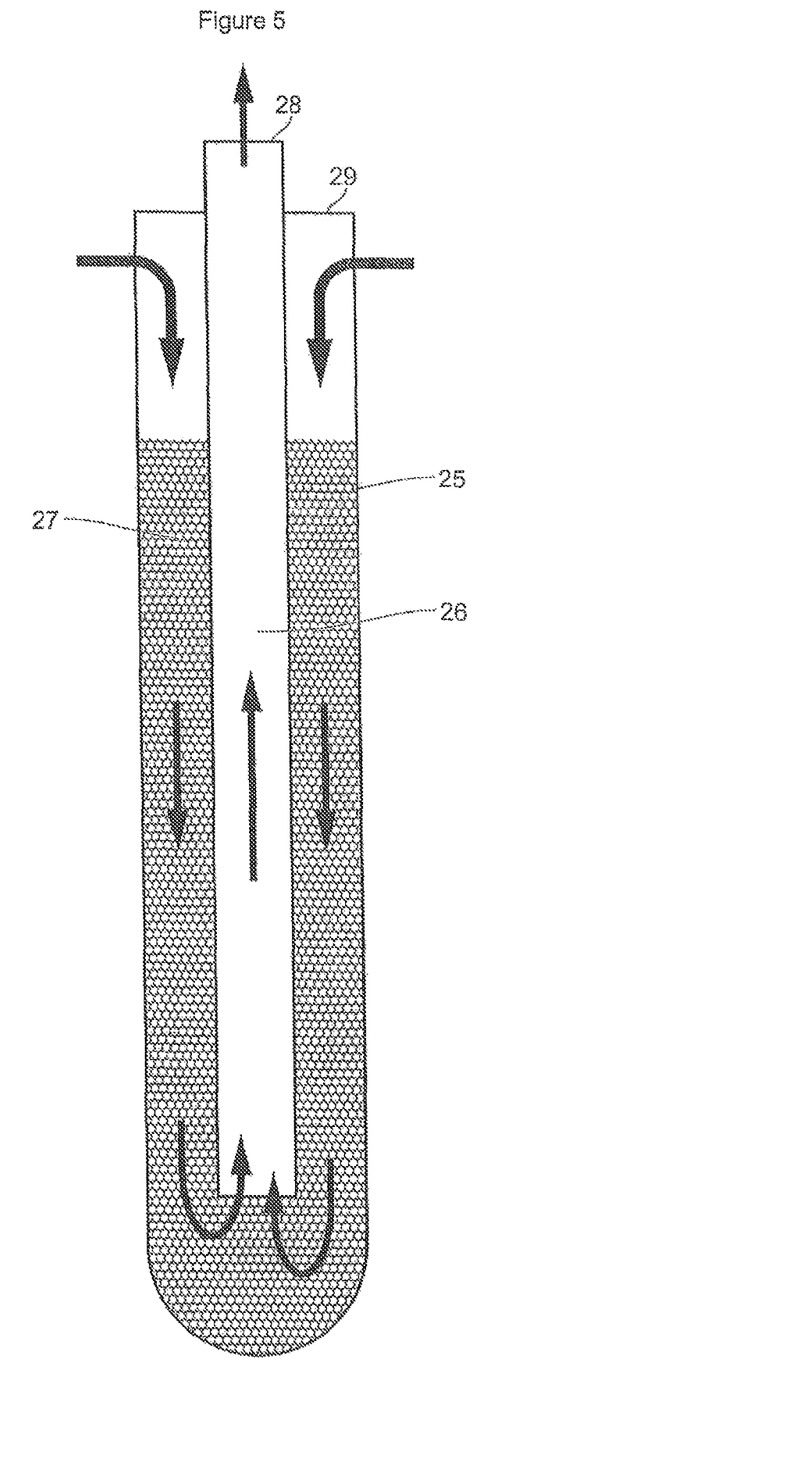
FIG. 5 shows a bayonet tube used as a tube to be heated provided for better comprehension of the circulation of the reaction fluids.

In the preferred variation of the invention shown in FIG. 3, instead of simple tubes, tubes termed bayonet tubes (4) are used as shown in FIG. 5.

These bayonet tubes (4) comprise a central tube (26) sunk into an outer envelope (25) having an end (28) which allows reaction effluents to be evacuated from the reactor. The outer envelope (25) comprises an end (29) via which reactant fluids are introduced into the annular zone (27) surrounding the central tube (26).

The annular zone (27) is at least partially filled with a steam reforming catalyst generally in the form of small cylinders or rings with a diameter of about 16 mm and a height of close to 11 mm.

The lower portion of the annular zone may be filled with beads with a diameter which is greater than that of the catalyst cylinders to limit the pressure drop corresponding to the change in direction of the reaction fluids.

The reactive fluids pass through the annular catalytic zone (27) then after turning through about 180° pass into a central tube (26) and are evacuated out of the furnace via the ends (28) of said central tube for collection in a collector or any other equivalent system generally located outside the furnace proper.

Because of the bayonet configuration, part of the heat from the effluent circulating in the central tube (26) is recovered to heat the feed circulating in the annular zone (27). The heat transfer efficiency is improved; the power of the furnace for a given feed flow rate is thus reduced.

EXAMPLE

In Accordance with the Invention

Natural gas steam reforming was carried out in a steam reforming furnace using bayonet tubes as shown in FIG. 3.

The fuel gas was a mixture of off-gas from a PSA (pressure swing absorption/desorption unit) and natural gas.

The gas from the PSA unit had the following molar composition:

| | |
|---|---|
| $H_2$: | 26% |
| $CO_2$: | 49% |
| $CH_4$: | 17% |
| CO: | 8% (with traces of nitrogen and water). |

When mixed with natural gas, a fuel gas with the following composition was obtained:

| | |
|---|---|
| $H_2$: | 25% |
| $CO_2$: | 48% |
| $CH_4$: | 18% |
| CO: | 9% |

The steam reforming furnace could produce 16000 kilomoles of hydrogen per hour, i.e. 32 tonnes/hour, which necessitated supplying about 40 MW (megawatts, i.e. $10^6$ watts) of heat to be transferred to the tubes.

With an excess of air of 25%, the fuel consumption was 950 kilomole/hour of fuel gas, and required 3115 kilomoles/hour of air preheated to 700° C.

The fumes were produced in an amount of 3911 kilomoles/h, i.e. 400000 m³/hour under the temperature and pressure conditions of the furnace.

The fumes exited the furnace at 975° C. The pressure of the fumes was 1.2 bars absolute (1 bar=$10^5$ pascal).

Part of the energy from the fumes was used to pre-heat the combustion air.

Each flue for evacuating fumes had an internal width of 350 mm and an internal height of 1000 mm, corresponding to a cross section of flow of 0.35 m².

Each flue received a fume flow of 10000 m³/hour.

The throughput of fumes in the flue was 8 m/s.

The steam reforming furnace of the invention comprised 1720 vertical bayonet type tubes the annular portion of which was filled with nickel-based catalyst.

The catalyst particles were formed as small cylinders with a diameter of 16 mm and a height of 11 mm.

Each bayonet tube was constituted by an outer envelope 12 m in length, 190 mm in external diameter and 135 mm in internal diameter.

The central tube located inside the outer envelope of a bayonet tube had a diameter of 35 mm.

The bayonet tubes were distributed in 40 rows, each row comprising 43 tubes.

The rows of tubes were spaced by 750 mm, and covered an internal furnace length of 30 m.

Over a given row, the spacing of the tubes measured by their centre-to-centre distance was 350 mm.

1677 porous burners were used, distributed in 39 rows interposed between the rows of tubes. Each row contained 43 burners.

One row of porous burners each 10 meters in length was interposed between each row of tubes and separated by a centre-to-centre distance of 350 mm.

The external diameter of a porous burner was 100 mm.

The diameter of the central perforated distributor was 20 mm.

The spacing between the distributor and the porous zone (denoted (19) in FIG. 4) was 10 mm.

The porous element (18) was 30 mm thick.

The porosity of the porous element (18) was 0.1.

Thus, the internal dimensions of the furnace of the invention were as follows:

| | |
|---|---|
| Width: | 15 m |
| Length: | 30 m |
| Height: | 14 m. |

By way of comparison, a prior art furnace with the same size as the furnace of the present example can only produce 12 tonnes of hydrogen instead of 32 tonnes/h.

Thus, the improvement in compactness of the steam reforming furnace of the present invention is remarkable.

The invention claimed is:

1. A furnace for steam reforming a hydrocarbon cut containing 1 to 30 carbon atoms for the production of hydrogen, comprising a set of vertical bayonet type tubes suspended on an upper wall of said furnace, partially filled with nickel-based catalyst, said tubes having a length of 10-14 meters being distributed in the form of longilinear rows, and for producing heat necessary for the steam reforming reaction in the vertical bayonet type tubes, porous longilinear burners disposed in the form of rows interposed between the rows of bayonet tubes to be heated, the distance between two rows of bayonet tubes between which a row of burners is interposed being in the range of 650 mm to 1000 mm, and the distance between a row of bayonet tubes and the closest row of porous longilinear burners being in the range of 300 mm to 500 mm, and wherein a center-to-center distance between two consecutive bayonet tubes belonging to the same row is in the range of 300 mm to 400 mm, and wherein the distance between the outer wall of a distributor and a porous element of the porous longilinear burner is in the range of 0.5 cm to 10 cm.

2. A steam reforming furnace according to claim 1, comprising flues located at the top of the furnace for supplying combustion air, and flues for collecting combustion fumes, located at the bottom of the furnace.

3. A steam reforming furnace according to claim 1, comprising flues located at the bottom of the furnace for supplying combustion air, and flues for collecting combustion fumes, located at the top of the furnace.

4. A steam reforming furnace according to claim 1, in which the porous longilinear burners have a porous element with a porosity of less than 50%.

5. A steam reforming furnace according to claim 1, comprising a central distributor of the porous burners divided into at least two sectors, each sector having orifices which increase in diameter with the axial distance along said central distributor.

6. A process for steam reforming natural gas or naphtha comprising providing a furnace according to claim 1, and supplying fuel and air to the porous longilinear burners, said fuel containing hydrogen in a proportion in the range of 5% to 100% molar.

7. A process for steam reforming natural gas or naphtha comprising providing a furnace according to claim 1, in which combustion air is supplied to the furnace having been preheated to a temperature of more than 600° C.

8. A process according to claim 7, wherein the air is preheated to more than 700° C.

* * * * *

UNITED STATES PATENT AND TRADEMARK OFFICE
CERTIFICATE OF CORRECTION

PATENT NO.        : 8,728,417 B2                                              Page 1 of 1
APPLICATION NO. : 12/593646
DATED             : May 20, 2014
INVENTOR(S)       : Giroudiere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-ninth Day of September, 2015

Michelle K. Lee
*Director of the United States Patent and Trademark Office*